United States Patent [19]

Ebner

[11] 4,378,149
[45] Mar. 29, 1983

[54] HIGH SPEED, LOW-COST CHARACTER PRINTER

[76] Inventor: Peter R. Ebner, Columbia Dr., Amherst, N.H. 03031

[21] Appl. No.: 213,224

[22] Filed: Dec. 5, 1980

[51] Int. Cl.$^3$ .............................................. B41B 19/00
[52] U.S. Cl. ......................................... 354/5; 346/30
[58] Field of Search .................... 354/5, 6, 7, 105, 106; 346/30

[56] References Cited

U.S. PATENT DOCUMENTS

| | | | |
|---|---|---|---|
| 3,555,555 | 1/1971 | Lambert | 346/30 |
| 3,832,488 | 8/1974 | Fahey et al. | 354/5 |
| 3,836,917 | 9/1974 | Mee | 354/5 |
| 3,952,311 | 4/1976 | Lapeyre | 354/5 |
| 3,973,130 | 8/1976 | Amemiya | 354/105 |
| 4,096,486 | 6/1978 | Pfeifer et al. | 354/5 |
| 4,168,894 | 9/1979 | Adolph | 354/109 |

Primary Examiner—Russell E. Adams

[57] ABSTRACT

A light-weight print head having an array of LED light emitting elements positioned adjacent an apertured mask is employed to photographically record at very high speeds characters having high resolution so that they are suitable for phototypesetting. The light transmitting apertures have a cross-sectional area substantially smaller than the cross-sectional area of the LEDs and since the apertures may be very accurately positioned with respect to each other, high character resolutions are obtainable despite misalignment between the mask and the array of LEDs. A flat, lightweight, flexible ribbon of conductors is coupled between the moving scanning head and a stationary source of electrical signals. An electrically insulating, opaque filler may advantageously be employed between the LEDs.

17 Claims, 3 Drawing Figures

HIGH SPEED, LOW-COST CHARACTER PRINTER

BACKGROUND OF THE INVENTION

This invention relates to graphic imaging systems and more specifically character printers which are particularly useful in phototypesetters.

During the last 30 years, numerous so-called second generation phototypesetters have been marketed. These machines flash-illuminate characters positioned upon a whirling character disk or drum, and the resulting optical image is projected by a lens system upon a photosensitive film. The size of the characters are changed by means of moving zoom lenses or the like or by rotating a lens turret to position various lenses at the optical projection axis. The characters are sequentially recorded upon the photosensitive film by mechanically scanning such film which may be accomplished in various ways. The film carriage may be moved relative to the optical axis, the projection lenses may be moved relative to the film platen, the whirling character disk may be moved relative to the film platen, or various combinations of the foregoing may be employed to sequentially project the characters upon the film to form a line of characters. Generally, the projection lens carriage assemblies are relatively heavy and bulky, as is the drum or disk bearing the images of the characters to be projected. Also, changes in the fonts involve manual replacement of the character disks, or film strips mounted upon a drum. Additionally, the electromechanical stepping devices for producing the above mentioned scanning motions are also relatively bulky and cumbersome. The speed of second generation machines is limited by the output carriage escapement speed and by character access time determined by the rotational speed of the font disk.

So-called third generation phototypesetters were introduced in the 1960s, most of which utilize cathode ray tubes for generating the characters upon the face of the tube. These character images are thereafter optically projected upon the film. In contrast with the components of the second generation machines, the electron beam is inertialess and the binary character codes thus may actuate the beam at much higher speeds than those obtainable by the second generation machines. Inertialess laser generated light beams have also been employed rather than cathode ray tubes. Many font families may be generated by these machines since the character generating codes may be densely packed during recordation upon magnetic storage media, such as floppy disks. Also, the character size may be electronically changed by changing the length of the beam traces making up the character components (See FIG. 1 of Pat. No. 3,952,311).

The result of the foregoing is that these machines have higher speeds, and greater flexibility in the character shapes and sizes produced. However, the third generation machines are usually considerably more expensive than the second generation machines; in 1979, they typically sold for $40,000 on up. In contrast, second generation machines in 1979 have been marketed for around $10,000.

It is a principal object of the present invention to provide a fourth generation phototypesetter that can be marketed for around $10,000, and yet have the speed and flexiblity of third generation machines.

It is a further object of the invention to provide a phototypesetter that is relatively light in weight and compact, since the relatively bulky high mass components of the second generation phototypesetters have been eliminated.

It is yet a further object of the present invention to provide a radically new phototypesetter having a printing device which is very inexpensive and may be rapidly replaced to reduce maintenance costs. One approach useful in attaining the above stated objectives is the subject of my co-pending application entitled "LED-Fiber Optic Character Printer," no. 181,312, filed Aug. 25, 1980.

The present invention is somewhat similar to U.S. Pat. No. 4,096,486 of Pfeifer et al issued June 20, 1978. Pfeifer teaches the use of a matrix of LEDs which form a plurality of points on a relatively narrow strip of film which is driven under the stationary matrix. The light emitted by the LEDs is focussed by a plurality of lenses upon the moving film. In FIG. 2, Pfeifer teaches the skewing of the linear arrays of LEDs and lenses so that the resolution of the image is satisfactory despite the fact that LEDs themselves are relatively large. In other words, without the skewing, the relatively large dimensions of the LEDs would produce unsatisfactory resolutions of the images. The teachings of Pfeifer are impracticable in attaining the above stated objects of the invention which require very rapid production of lines of characters across the film perpendicular to the leading motion of the film, to record line after line of characters on the film. If one were to attempt to adapt the teachings of Pfeifer, a relatively heavy platen supporting photosensitive roll material would have to be driven in a direction perpendicular to the leading motion which provides the line by line scanning of sentences. Relatively heavy drive motors would be required to drive the platen bearing the film and the speed of operation would be limited by the inertia of the start-stop motion at the beginning and end of the line scan. Furthermore, the manufacturing cost of the above-mentioned heavy and accurately aligned platen drive system would be relatively high, and the use of the lens matrix of Pfeifer would limit the accuracy in the resolution of the images due to manufacturing and alignment tolerances. Another advantage of the present invention over the teaching of Pfeifer is the fact that Pfeifer must maintain precise optical geometry to assure proper focus whereas the present invention is essentially a contact printing process.

SUMMARY OF THE INVENTION

In accordance with certain preferred embodiments of the invention, a light weight scanning head is driven by a simple belt-pulley drive across a roll of photosensitive material which remains stationary during the production of any particular line. A mask having tiny light transmitting apertures therein restricts the light projected upon the film, and in contrast with the above stated lens arrangement in the prior art, may be made extremely accurate. Preferably, the light transmitting apertures are formed photographically upon film so that very accurate placement of the apertures relative to each other may be obtained at a low cost. On the other hand, the alignment of the photomask with respect to the LEDs is not critical since the light transmitting apertures are substantially smaller than the areas of the LEDs, so that excellent resolution may be obtained in view of the accurate relative placement of the apertures with respect to each other upon the mask. Besides the above stated cost advantages and lack of alignment criticality, the mask is very light and maintains the weight of the scanning head at a minimum, thereby to minimize start-stop inertia to maximize recording speeds, along with minimizing the size and cost of the drive means. In accordance with a further preferred feature of the invention, a lightweight, relatively flat flexible ribbon of conductors is employed to energize the LEDs which renders the rapid scanning of the head feasbile. Such a flat ribbon of conductors also minimizes induced mechanical fatigue and friction which would otherwise be induced within a conventional round cable.

A further feature of the invention is to employ an electrically insulating light opaque filler between the LEDs to insulate the control leads from each other and at the same time minimize optical cross talk between the LEDs.

Other objects, features and advantages of the present invention will become apparent upon the study of the following description taken in conjunction with the drawings, in which:

FIG. 1 discloses an embodiment of the present invention;

FIG. 2 schematically illustrates a portion of the print head contacting or positioned in close proximity with the photosensitive material;

FIG. 3 discloses an exemplary character to be recorded on the film.

FIG. 4 illustrates the use of an electrically conductive mask for enabling activation of the LEDs; and FIG. 5 illustrates another embodiment of the printhead.

DETAILED DESCRIPTION

Figure 1:
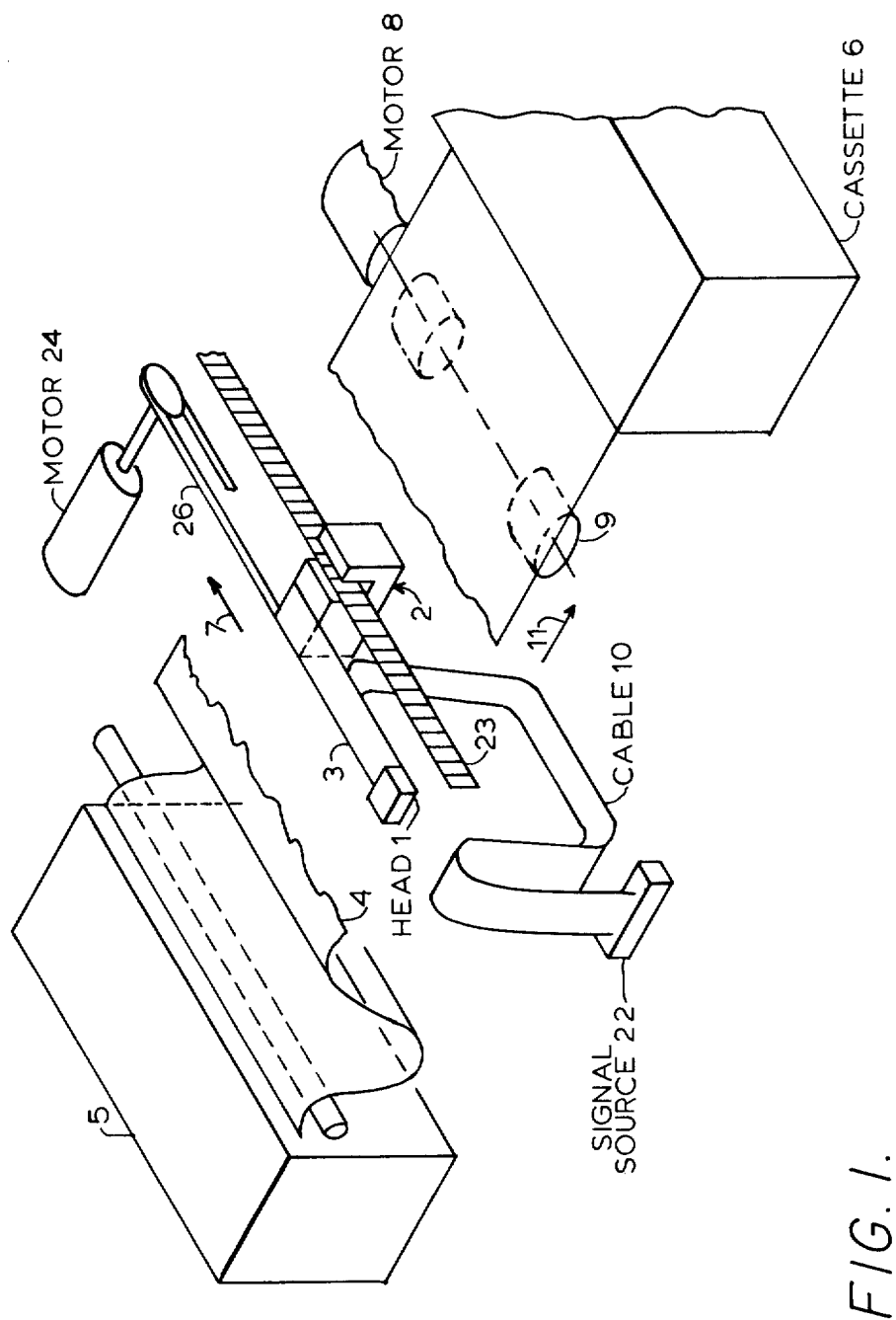

Referring now to FIG. 1, print head 1 is positioned upon print head drive carriage 2 via flat spring element 3 which upwardly mechanically biases the print head against film 4 which is supplied from supply cassette 5 and which, after character recordation, is stepped toward output cassette 6. Print head 1 contacts film 4 and rapidly scans across the film in the direction indicated by arrow 7 to record a line of characters or other indicia thereon. After the recordation of a line of indicia, leading motor 8 causes roller means 9 to cause the film to be stepped in a direction indicated by arrow 11 which is perpendicular to the print head scanning direction to set the stage for the recordation of the next line of characters.

Figure 3:
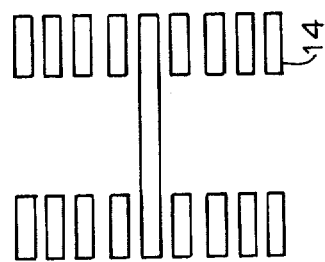
Figure 2:
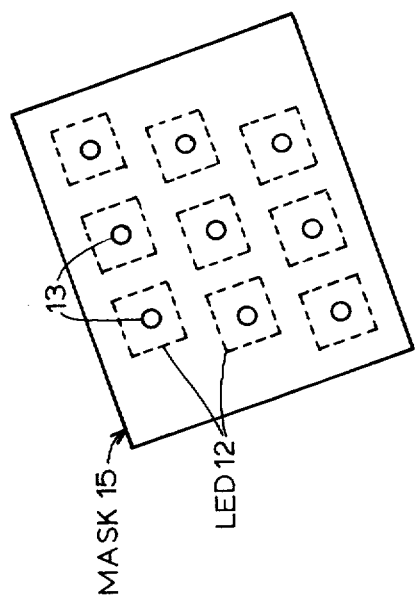
Figure 4:
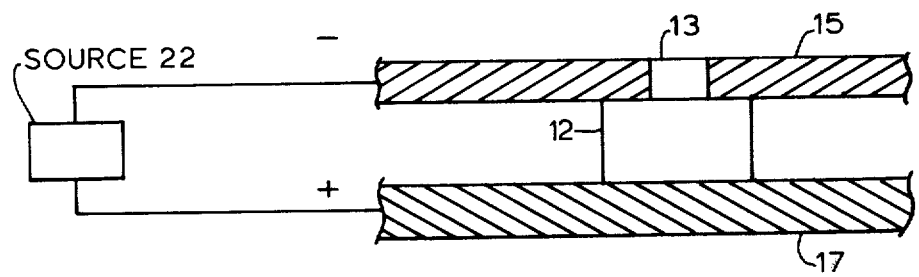

The print head includes an array of typically one hundred light emitting diodes 12 some of which are partially indicated in FIG. 2. A mask 15 having tiny light transmitting apertures 13 therein is superimposed over the array of LED chips. The currently available LED chips are roughly 15 mils on a side and the tiny light transmitting apertures 13 have a diameter substantially smaller than 15 mils, about 2 mils being preferred. It is an important aspect of the present invention that the light transmitting apertures 13 be accurately placed relative to each other so that the linear segments 14 of the characters, shown in FIG. 3, may be accurately formed. On the other hand, it is highly desirable that shifts in the position of the mask with respect to the LED array either during manufacturing or use do not adversely affect the high resolution of the recorded character segments. It should be apparent from observing the skewing of the linear arrays of LED chips with respect to the scanning direction that the horizontal segments may be accurately placed and closely packed together relative to each other. The angle of skewing between the direction of alignment of the linear arrays and the direction of motion of the print head is preferably quite small so that the character segments are close together or somewhat overlap each other. One embodiment of the mask 15 of FIG. 4 consists of a thin metallic electrically conductive sheet having tiny apertures punched out or otherwise formed within the sheet, and thus the mask forms a single electrical return path for all of the LEDs which are being contacted by the mask. In the case of 100 LEDs, 100 return paths, one of which is indicated at 17 in FIG. 4, would be electrically coupled to signal source 22. This configuration results in economy of manufacture. Alternatively, the mask may consist of photographic film so that tiny light conducting apertures may be very accurately formed by photomasking techniques well known in the art. In this case, the apertures are not physically formed within the mask, but are photographically formed so that each aperture transmits light while light is blocked by the dark areas on the film between the apertures. The above mentioned advantage of employing the mask to function as a single return path may be implemented if desired by coating the film with a transparent conductive layer such as "Nesa" glass. Thus, regardless of the technique for forming the tiny apertures, which are preferably about 2 mils in diameter, accurate alignment of the mask with respect to the LED arrays is not required since the ratio of the area of the apertures over the area of the chips is quite small, and thus, initial alignment or misalignment of the mask arrangement during machine operation with respect to the LEDs is noncritical, thereby to save manufacturing and maintenance costs. As discussed herein above, it is also an important object of the present invention that character generation be produced at very high rates, and thus, it is important that the print head be light in weight, and such may be readily accomplished through the use of the thin, lightweight mask of light transmitting apertures, affixed to an array of LEDs mounted upon a chip substrate.

Figure 5:
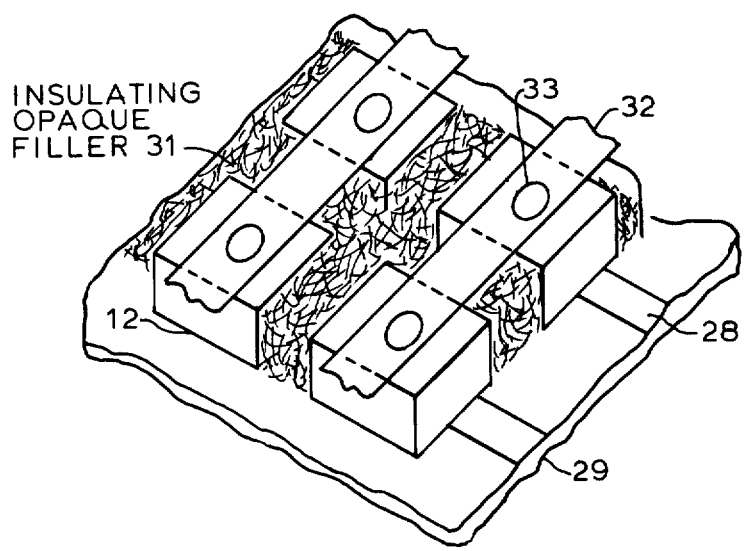

Instead of employing 100 LED control leads (plus the return lead) for controlling a 10×10 matrix of LEDs, it is especially desirable to employ a "row-column" address mode for the LEDs, to sharply reduce the number of control leads required to selectively energize the LEDs. To form the embodiment of FIG. 5, a plurality of column conductors 28 would be plated upon a substrate 29 and columns of LEDs would thereafter be bonded over the column conductors. An electrically insulating and nonlight transmitting filler material 31 such as black epoxy, would fill the gaps between the LEDs as indicated, and the upper surfaces of the LEDs would be thereafter lapped to fully expose the upper surfaces thereof. A metallic layer such as aluminum would thereafter be applied over the entire area, preferably by vapor disposition, and a photoresist would be applied over the metallic layer. The row conductors 32 and apertures 33 would thereafter be formed by conventional photomask-etching techniques so that the row conductors 32 would cover the upper surfaces of each row of LEDs. The photomask would be configured so that the vapor deposited metallic layer would be etched away in the gaps between each row, and also etched in the central areas of each LED to form the above mentioned apertures 33. Thus, in accordance with a feature of the invention, the filler material 31 electrically insulates the row conductors 32 formed in the upper plane of the top surface of the LEDs from the column conductors 28 formed upon the substrate 29, and also electrically insulates the row conductors from each other. The epoxy of other suitable electrically insulating material would also have the dual function of optically isolating each LED from its neighbor in order to minimize optical cross talk which occurs since the LEDs are light transmissive. A non-electrically conductive mask having light conducting apertures, aligned with apertures 33 is thereafter bonded to the upper surface to complete fabrication of the print head.

A flat, light-weight, flexible cable of tiny electrically conductive wires 10 is electrically coupled between print head 1 and a source 22 of digital signals which selectively energize various LEDs in sequence as the print head 1 scans across the film in the direction indicated by arrow 7. The signals are sequentially produced at a rate controlled by timing fence 23 which is a "picket fence" light interrupter, the operation of which is well-known in the art. The print head carriage drive motor 24 drives the print head carriage 2 via belt 26, and the use of timing fence 23 synchronizes the sequential production of the digital signals generated by source 22 with the speed of motor 24. After the generation of a line of characters or other indicia, leading motor 8 causes the film to be stepped in a direction perpendicular to the print head scan direction and the recordation process is repeated.

It is also a feature of the present invention to enable very rapid scanning by employing the substantially flat flexible and light-weight ribbon cable 10 of electrical conductors. In contrast with the use of conventional round cable, the induced fatigue within the cable is minimized along with friction which is produced by rubbing of the conductors as they slide over each other during flexing. The mask may be either in direct contact with the sheet or may be in close proximity therewith. For example, the mask may be slightly separated from the sheet by a film of air or oil.

It should be understood that other components and configurations may be readily substituted for those described in order to practice the invention, and that the scope of the invention is to be limited only by the following claims. Besides use in a phototypesetter, this invention may be employed in line by line telecopiers, computer readout printers, graph recordation devices, etc. While a matrix of LED devices which produce visible light is preferred, the present invention is not limited to the use of visible light.

Other sources of electromagnetic radiation capable of producing latent images potentially developable in any sensitized material may be employed; e.g., infrared, ultraviolet, and X-ray, provided of course that the mask is formed of a suitable material to transmit such radiation only through the apertures or windows formed in the mask. The term array is intended to include any regular or irregular placement of the print head emitters, although linear placement as shown in FIG. 2 is preferred.

I claim:

1. In a printer exposing a receptor sheet to actinic radiation signals for forming indicia thereon:
   a. a print head having a plurality of actinic radiation emitting sources together with a mask including at least one array of actinic radiation transmitting apertures substantially smaller than said actinic radiation emitting sources, each aperture being aligned with an associated actinic radiation emitting source;
   b. means for moving said print head across said receptor sheet in a first direction;
   c. a source of electrical signals for selectively controlling the activation of said actinic radiation sources;
   d. electrical transmission means coupled between said source of electrical signals and said plurality of actinic radiation sources for causing said actinic radiation sources to be selectively activated during the motion of said print head across said receptor sheet in said first direction;
   e. means for moving said receptor sheet in a second direction transverse to said first direction of motion of said print head after the recordation of a line of indicia recorded upon said receptor sheet; and,
   f. means for maintaining said receptor sheet in close proximity with said print head during the scanning motion of said print head in said first direction across said receptor sheet.

2. The combination as set forth in claim 1 wherein said actinic radiation transmitting apertures comprise a photographic image formed upon a light weight substrate.

3. The combination as set forth in claims 1 or 2 wherein said electrical transmission means comprises a light weight, flexible ribbon of electrical conductors.

4. The combination as set forth in claims 1 or 2 wherein said mask is electrically conductive.

5. The combination as set forth in claim 4 wherein said electrical transmission means comprises a flexible, light weight ribbon of electrical conductors.

6. In a printer exposing a receptor sheet to actinic radiation for forming indicia thereon:
   a. a print head consisting essentially of a plurality of actinic radiation sources together with a mask including at least one array of actinic radiation transmitting apertures substantially smaller than said actinic radiation emitting sources, each aperture being aligned with an associated actinic radiation emitting source;
   b. means for moving said print head across said receptor sheet in a first direction;
   c. a source of electrical signals for selectively controlling the activation of said actinic radiation emitting sources;
   d. electrical transmission means coupled between said source of electrical signals and said plurality of actinic radiation emitting sources for causing said actinic radiation sources to be selectively activated during the motion of said print head across said receptor sheet in said first direction;
   e. means for moving said receptor sheet in a second direction transverse to said first direction of motion of said print head after the recordation of a line of indicia recorded upon said receptor sheet; and,
   f. means for maintaining said receptor sheet in close proximity with said print head during the scanning motion of said print head in said first direction across said receptor sheet.

7. The combination as set forth in claim 6 wherein said actinic radiation transmitting apertures comprise a photographic image formed upon a light weight substrate.

8. The combination as set forth in claims 6 or 7 wherein said electrical transmission means comprises a flat light weight flexible ribbon of electrical conductors.

9. The combination as set forth in claim 7 wherein said mask is electrically conductive.

10. The combination as set forth in claim 9 wherein said electrical transmission means comprises a flat, flexible light weight ribbon of electrical conductors.

11. In a printer exposing a receptor sheet to actinic radiation signals for forming indicia thereon:
   a. a print head having a plurality of actinic radiation emitting sources together with a mask positioned adjacent said sources including at least one array of actinic radiation transmitting apertures substantially smaller than said actinic radiation sources, each aperture being aligned with an associated actinic radiation emitting sources;
   b. means for moving said print head across said receptor sheet in a first direction;
   c. a source of electrical signals for selectively controlling the activation of said actinic radiation emitting sources;
   d. electrical transmission means coupled between said source of electrical signals and said plurality of actinic radiation emitting sources for causing said actinic radiation sources to be selectively activated during the motion of said print head across said receptor sheet in said first direction;
   e. means for moving said receptor sheet in a second direction transverse to said first direction of motion of said print head after the recordation of a line of indicia recorded upon said receptor sheet; and,
   f. means for maintaining said receptor sheet in close proximity with said flat mask during the scanning motion of said print head in said first direction across said receptor sheet.

12. The combination as set forth in claim 11 wherein said actinic radiation transmitting apertures comprise a photographic image formed upon a light weight substrate.

13. The combination as set forth in claims 11 or 12 wherein said electrical transmission means comprises a flat, light weight, flexible ribbon of electrical conductors.

14. The combination as set forth in claim 12 wherein said mask is electrically conductive.

15. The combination as set forth in claim 14 wherein said electrical transmission means comprises a flat, flexible, light weight ribbon of electrical conductors.

16. The combination as set forth in claims 1, 2, 11, or 12 further including an electrically insulating filler positioned between said radiation sources, said filler also having low light transmissivity.

17. In a printer exposing a receptor sheet to actinic radiation signals for forming indicia thereon:
   a. a print head having a plurality of actinic radiation emitting sources together with a mask including at least one array of actinic radiation transmitting apertures substantially smaller than said actinic radiation emitting sources, each aperture being aligned with an associated actinic radiation emitting source, said print head further including a set of column conductors coupled to first portions of said sources, a set of row conductors coupled to second portions of said sources and an electrically insulating filler positioned between said radiation sources, said filler also having low light transmissivity;
   b. means for moving said print head across said receptor sheet in a first direction;
   c. a source of electrical signals for selectively controlling the activation of said actinic radiation sources;
   d. electrical transmission means coupled between said source of electrical signals and said plurality of actinic radiation sources for causing said actinic radiation sources to be selectively activated during the motion of said print head across said receptor sheet in said first direction;
   e. means for moving said receptor sheet in a second direction transverse to said first direction of motion of said print head after the recordation of a line of indicia recorded upon said receptor sheet; and,
   f. means for maintaining said receptor sheet in close proximity with said print head during the scanning motion of said print head in said first direction across said receptor sheet.

* * * * *